(12) United States Patent
Lu et al.

(10) Patent No.: US 12,145,096 B2
(45) Date of Patent: Nov. 19, 2024

(54) PLANAR SEPARATION COMPONENT FOR GAS CHROMATOGRAPHY AND MANUFACTURING METHOD AND USE THEREOF

(71) Applicant: National Taiwan Normal University, Taipei (TW)

(72) Inventors: Chia-Jung Lu, Taipei (TW); Chih-Chieh Fan, New Taipei (TW)

(73) Assignee: National Taiwan Normal University, Taipei (TW)

( * ) Notice: Subject to any disclaimer, the term of this patent is extended or adjusted under 35 U.S.C. 154(b) by 491 days.

(21) Appl. No.: 17/365,469

(22) Filed: Jul. 1, 2021

(65) Prior Publication Data

US 2022/0176306 A1 Jun. 9, 2022

(30) Foreign Application Priority Data

Dec. 3, 2020 (TW) ................................. 109142558

(51) Int. Cl.
*B01D 53/02* (2006.01)
*G01N 30/86* (2006.01)
(Continued)

(52) U.S. Cl.
CPC ....... *B01D 53/025* (2013.01); *G01N 30/8624* (2013.01); *G01N 30/02* (2013.01);
(Continued)

(58) Field of Classification Search
CPC .. B01D 53/025; G01N 30/8624; G01N 30/02; G01N 30/606; G01N 30/6095; G01N 2030/025; G01N 30/00
See application file for complete search history.

(56) References Cited

U.S. PATENT DOCUMENTS 6,156,273 A * 12/2000 Regnier ............. G01N 30/6095
204/600
6,368,871 B1 * 4/2002 Christel ............... B01J 19/0093
204/600

(Continued)

FOREIGN PATENT DOCUMENTS

TW 200831173 A 8/2008
WO WO-2011105392 A1 * 9/2011 ......... C23C 16/0281

OTHER PUBLICATIONS

Search Report appended to an Office Action, which was issued to Taiwanese counterpart application No. 109142558 by the TIPO on May 27, 2021, with an English translation thereof.

*Primary Examiner* — Stephen Hobson

(57) ABSTRACT

A planar separation component for gas chromatograph includes a substrate made of aluminum, a porous anodic aluminum oxide separation member, and a cover unit. The substrate has a planar body, and a first flow channel having a first inlet and a first outlet. The separation member is formed on the substrate, and has a channel-defining wall defining the first flow channel and a plurality of nanosized pores in spatial communication with the first flow channel. The cover unit is bonded to the planar body for covering the first flow channel. Methods for manufacturing the planar separation component and separating a mixture containing compounds different in boiling point using the planar separation component are also disclosed.

12 Claims, 6 Drawing Sheets

(51) Int. Cl.
*G01N 30/02* (2006.01)
*G01N 30/60* (2006.01)

(52) U.S. Cl.
CPC ..... *G01N 2030/025* (2013.01); *G01N 30/606* (2013.01); *G01N 30/6095* (2013.01)

(56) References Cited

U.S. PATENT DOCUMENTS

| | | | | |
|---|---|---|---|---|
| 6,699,392 | B1* | 3/2004 | Manginell | G01N 30/6095 95/82 |
| 9,897,576 | B2* | 2/2018 | Matsuoka | G01N 30/54 |
| 9,921,194 | B2* | 3/2018 | Du | G01N 30/6086 |
| 9,995,411 | B1* | 6/2018 | Moorman | F16K 99/0036 |
| 10,132,783 | B2* | 11/2018 | Gianchandani | G01N 30/88 |
| 10,151,732 | B1* | 12/2018 | Moorman | G01N 30/606 |
| 10,334,879 | B2* | 7/2019 | Barkley | F04B 19/24 |
| 10,551,361 | B2* | 2/2020 | Lim | G01N 30/6086 |
| 2002/0125192 | A1* | 9/2002 | Lopez | G01N 30/6065 210/656 |
| 2005/0000900 | A1* | 1/2005 | Huang | B01D 15/08 210/656 |
| 2005/0242017 | A1* | 11/2005 | Staats | G01N 30/6095 324/318 |
| 2006/0000772 | A1* | 1/2006 | Sano | B01D 69/141 210/656 |
| 2006/0214101 | A1* | 9/2006 | Takahashi | H01J 49/0418 250/288 |
| 2006/0283324 | A1* | 12/2006 | Roques | G01N 30/6095 96/101 |
| 2007/0102362 | A1* | 5/2007 | Iida | B01L 3/502753 210/656 |
| 2009/0314065 | A1* | 12/2009 | Kiyomoto | G01N 30/6004 73/61.53 |
| 2010/0032357 | A1* | 2/2010 | Kiyomoto | G01N 30/52 216/41 |
| 2011/0108522 | A1* | 5/2011 | Rozing | G01N 30/6095 264/293 |
| 2011/0132196 | A1* | 6/2011 | Suzuki | G01N 30/6095 156/77 |
| 2013/0199264 | A1* | 8/2013 | Seike | B03C 3/41 73/23.4 |
| 2013/0206667 | A1* | 8/2013 | Steinecker | B05D 7/222 210/198.2 |
| 2014/0165841 | A1* | 6/2014 | Otsuka | B01D 53/025 96/101 |
| 2014/0275692 | A1* | 9/2014 | Patel | B01D 39/1623 585/818 |
| 2015/0260694 | A1* | 9/2015 | Matsuoka | G01N 30/30 73/23.41 |
| 2016/0077063 | A1* | 3/2016 | Traudt | G01N 30/30 73/23.39 |
| 2016/0103104 | A1* | 4/2016 | Gianchandani | G01N 30/6095 73/23.41 |
| 2016/0116447 | A1* | 4/2016 | Dryden | H05B 3/20 219/539 |
| 2016/0266073 | A1* | 9/2016 | Du | G01N 30/6086 |
| 2018/0143210 | A1* | 5/2018 | Ayyub | G01N 33/6806 |
| 2018/0366275 | A1* | 12/2018 | Fukuoka | H01M 10/52 |
| 2024/0192190 | A1* | 6/2024 | Sequeira | G01N 33/2823 |

* cited by examiner

PLANAR SEPARATION COMPONENT FOR GAS CHROMATOGRAPHY AND MANUFACTURING METHOD AND USE THEREOF

CROSS-REFERENCE TO RELATED APPLICATION

This application claims priority of Taiwanese Patent Application No. 109142558, filed on Dec. 3, 2020.

FIELD

The present disclosure relates to a planar separation component for gas chromatography which includes a porous at aluminum oxide separation member. The present disclosure also relates to a method for manufacturing the planar separation component, and a separation method using the planar separation component.

BACKGROUND

Gas chromatography is a technique adapted for separating various chemical compounds in a mixture. Specifically, gas chromatography involves subjecting the mixture to a vaporization process by heating to obtain a gaseous analyte, and then subjecting the gaseous analyte to an interaction with a stationary phase that is coated on an inner surface of a chromatography column. Therefore, a chromatogram showing retention time, which is the time the chemical compounds spend flowing along the chromatography column depending on the interactions with the stationary phase based on their different chemical and physical properties (such as boiling point), can be obtained to identify the compounds in the gaseous analyte (i.e., the mixture). Since gas chromatography is conducted under a high temperature, the stability of the stationary phase is an important factor which affects the results of a gas chromatography analysis.

In a conventional gas chromatography analysis, separation of high-boiling point chemical compounds (e.g., having a boiling point of higher than 65° C. or a number of carbon atoms higher than 6) in a mixture s usually conducted using a high-molecular weight polymer (e.g., polysilane polymers) as the stationary phase material of a chromatography column, in contrast to a capillary chromatography column using a porous inorganic material (e.g., molecular sieves, activated aluminum oxide powder, etc.) as the stationary phase material for separating low-molecular compounds which have a low boiling point. However, when the chromatography column containing a high-molecular weight polymer that serves as the stationary phase material is used for separating low-molecular weight compounds having a low boiling point, the low-molecular weight compounds cannot be easily captured and adsorbed by the stationary phase material upon diffusion thereinto, and thus, the separation effect is poor. On the other hand, when a capillary chromatography column containing a porous inorganic material, which serves as the stationary phase material and is fixed by an organic packing material, is used for separating high-molecular weight compounds having a high boiling point under a high temperature, the organic packing material might be easily damaged due to the high temperature, further negatively affecting the porous inorganic material. In addition, excessive adsorption of the high-molecular weight compounds to the porous inorganic material might occur, causing the thus adsorbed high-molecular weight compounds inability to be eluted out of the capillary chromatography column, and thereby adversely affecting the separation efficiency. Therefore, in the conventional gas chromatography analysis, it is necessary to use different chromatography columns for separating compounds having different boiling points, so that effective separation of each of the compounds can be achieved.

In addition, since the inner diameter of a gas chromatography column is very small, forming a uniform and stable stationary phase on the inner wall of such chromatography column is difficult.

SUMMARY

Therefore, an object of the present disclosure is to provide a planar separation component for gas chromatography that can alleviate at least one of the drawbacks of the prior art.

The planar separation component includes a substrate, a porous anodic aluminum oxide separation member, and a cover unit. The substrate is made of an aluminum material, and has a planar body and a spiral first flow channel. The planar body has a first surface and a second surface that is opposite to the first surface. The first flow channel is indented from the first surface toward the second surface, and has a first inlet configured to allow an analyte to enter the first flow channel, and a first outlet configured to allow the analyte to exit from the first flow channel. The porous anodic aluminum oxide separation member is formed on the substrate, and has a channel-defining wall and a plurality of nanosized pores. The channel-defining wall defines the first flow channel, and has a confronting surface that faces the first flow channel, and a contacting surface that is opposite to the confronting surface and in contact with the planar body. The nanosized pores are indented from the confronting surface toward the contacting surface, and are in spatial communication with the first flow channel. The cover unit is bonded to the first surface of the planar body of the substrate for covering the first flow channel.

Another object of the present disclosure is to provide a method for manufacturing a planar separation component for gas chromatography that can alleviate at least one of the drawbacks of the prior art.

The manufacturing method includes:
(A) providing a substrate that is made of an aluminum material, the substrate having a first surface and a second surface that is opposite to the first substrate;
(B) forming a spiral first flow channel in the substrate, the first flow channel being indented from the first surface toward the second surface, being defined by a first wall portion of the substrate, and having a first inlet that is configured to allow an analyte to enter the first flow channel, and a first outlet that is configured to allow the analyte to exit from the first flow channel;
(C) subjecting the substrate to an anodic oxidation treatment so as to form a porous anodic aluminum oxide separation member, the separation member having a channel-defining wall and a plurality of nanosized pores, the channel-defining wall being formed from the first wall portion of the substrate, and having a confronting surface that faces the first flow channel, and a contacting surface that is opposite to the confronting surface and in contact with the substrate, the nanosized pores being indented from the confronting surface toward the contacting surface and being in spatial communication with the first flow channel; and
(D) bonding a cover unit to the first surface of the substrate so as to cover the first flow channel.

Still another object of the present disclosure is to provide a method for separating a mixture containing compounds different in boiling point that can alleviate at least one of the drawbacks of the prior art.

The separation method includes subjecting the mixture to chromatography using the abovementioned planar separation component.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

The drawings are not drawn to scale and are provided merely to illustrate the structural/positional relationship among the features.

Figure 1:
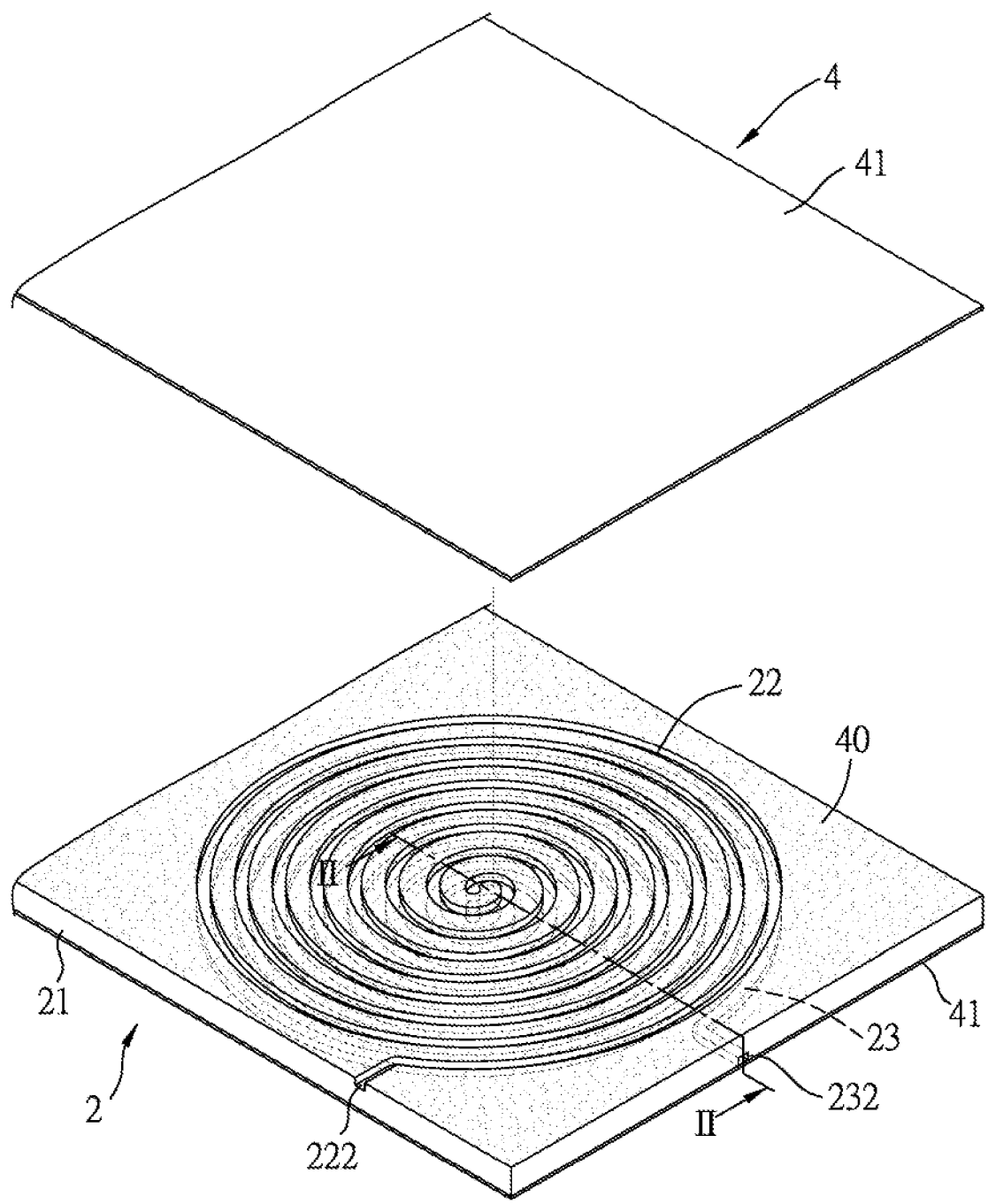
FIG. 1 is a fragmentary, exploded schematic view illustrating an embodiment of a planar separation component for gas chromatography according to the present disclosure.
Figure 2:
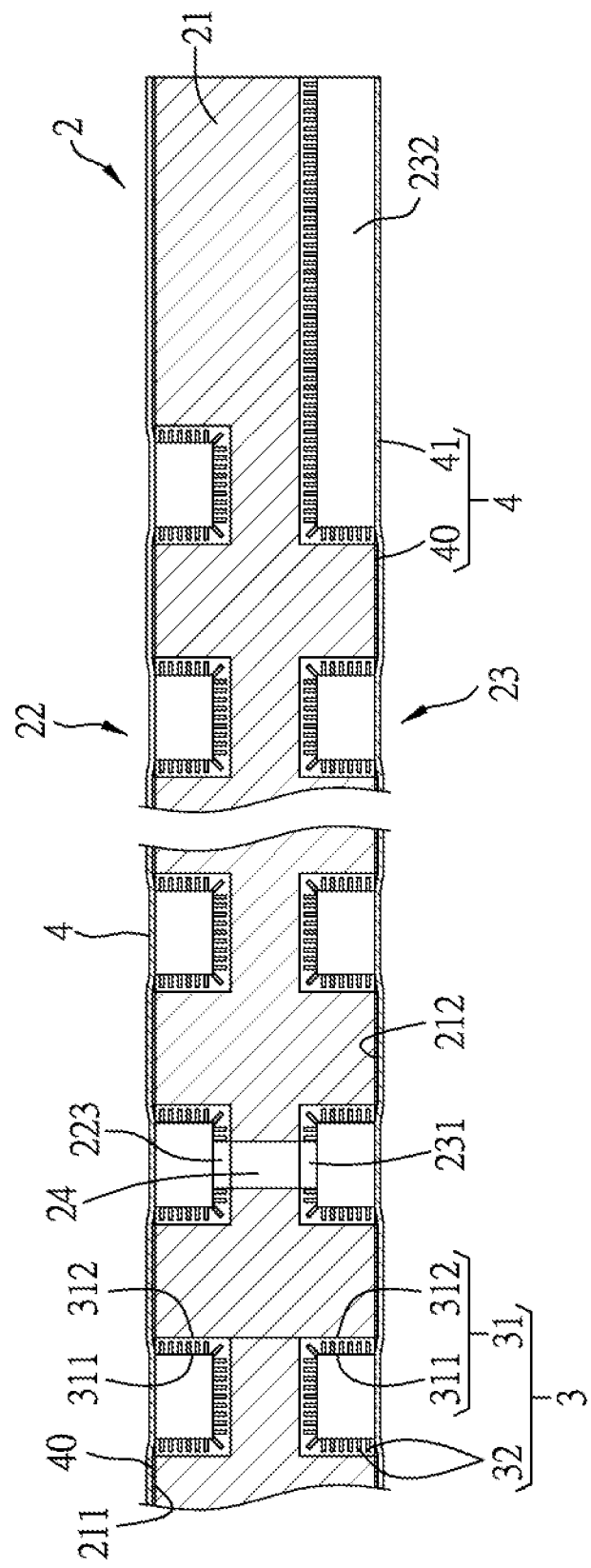
FIG. 2 is a fragmentary schematic cross-sectional view of the planar separation component taken along line II-II of FIG. 1.

Referring to FIGS. 1 and 2, an embodiment of a planar separation component for gas chromatography according to the present disclosure includes a substrate 2, a porous anodic aluminum oxide separation member 3 (serving as a stationary phase), and two cover units 4.

The substrate 2 is made of an aluminum material, and has a planar body 21, a spiral first flow channel 22, a spiral second flow channel 23, and an interconnecting channel 24.

To be specific, the planar body 21 has a first surface 211 and a second surface 212 that is opposite to the first surface 211. The first flow channel 22 is indented from the first surface 211 toward the second surface 212. The first flow channel 22 has a first inlet 222 that is positioned at an edge region of the planar body 21 and that is configured to allow an analyte to enter the first flow channel 22, and a first outlet 223 that is positioned at a central region of the planar body 21 and that is configured to allow the analyte to exit from the first flow channel 22. The second flow channel 23 is indented from the second surface 212 toward the first surface 211. The second flow channel 23 has a second inlet 231 that is positioned at the central region of the planar body 21 and that is configured to allow the analyte to enter the second flow channel 23, and a second outlet 232 that is positioned at another edge region of the planar body 21 and that is configured to allow the analyte to exit from the second flow channel 23. The interconnecting channel 24 extends through the central region of the planar body 21 to interconnect and is in spatial communication with the first outlet 223 of the first flow channel 22 and the second inlet 231 of the second flow channel 23.

In this embodiment, each of the first and second flow channels 22, 23 has a substantially U-shaped section, and a channel width of 1.0 mm and a channel length of 3.0 m, but is not limited thereto. It should be noted that each of the first and second flow channels 22, 23 may have a substantially V-shaped section or a section of other shape in other embodiments.

The separation member 3 is formed on the substrate 2 to contact with an analyte and separate the compounds therein, and has a channel-defining wall 31 and a plurality of nanosized pores 32. The channel-defining wall 31 has a first wall section that defines the first flow channel 22, and a second wall section that defines the second flow channel 23. Each of the first and second wall sections has a confronting surface 311 and a contacting surface 312 that is opposite to the confronting surface 311 and that is in contact with the planar body 21. The confronting surface 311 of the first wall section faces the first flow channel 22, and the confronting surface 311 of the second wall section faces the second flow channel 23. The nanosized pores 32 in each of the first and second wall sections are indented from the confronting surface 311 toward the contacting surface 312. The nanosized pores 32 in the first wall section are in spatial communication with the first flow channel 22, and the nanosized pores 32 in the second wall section are in spatial communication with the second flow channel 23. The separation member 3 is integrally formed with the planar body 21 of the substrate 2.

Since most of the nanosized pores 32 has a depth that extends in a direction perpendicular to the extension direction of a corresponding one of the first and second flow channels 22, 23, and the open and closed ends of each of the nanosized pores 32 are substantially equal width, the shortcomings encountered by a conventional chromatography column can be overcome. That is, an analyte might be undesirably trapped at the closed ends of the pores of porous inorganic particles (serving as the stationary phase) randomly distributed in the conventional chromatography column and cannot be eluted out due to the pores' open ends being wider and the pores' closed ends being narrower. Therefore, based on the separation member 3 made of porous anodic aluminum oxide, the planar separation component for gas chromatography according to the present disclosure can effectively separate mixtures containing compounds which have high and low boiling points.

The cover units 4 are used for respectively covering the first and second flow channels 22, 23. To be specific, each of the cover units 4 includes a flexible cover 41 and a bonding layer 40 that bonds the flexible cover 41 to the substrate 2, and the flexible covers 41 are respectively bonded to the first and second surfaces 211, 212 of the planar body 21 of the substrate 2 so as to cover the first and second flow channels 22, 23.

It should be noted that, since the planar separation component of the present disclosure can be used in chromatography for separating mixtures containing compounds which have high and low boiling points simultaneously, the flexible covers 41 and the bonding layers 40 are made of a material that has a heat resistance to 300° C. and more, so that effective separation of the mixtures can be performed under a high temperature.

In addition, in order to prevent the cover units 4 from deformation, peeling off or cracking during hot-press bonding or temperature change upon use due to difference in the expansion coefficient between the cover unit 4 and the substrate 2, the cover units 4 may be made of a material that has a high flexibility and a good heat resistance so as to be securely bonded to the substrate 2. For instance, the flexible cover 41 may be an aluminum foil, and the bonding layer 40 may be made of an inorganic adhesive material (e.g., glass powder) or a high-molecular weight polymer that has a heat resistance to 300° C. and more.

Each of the first and second flow channels 22, 23 may have a channel width that approximately range from 0.001 cm to 1.0 cm.

Each of the nanosized pores 32 has a width that ranges from 10 nm to 500 nm, and a depth that ranges from 0.01 μm to 500 μm.

Figure 3:
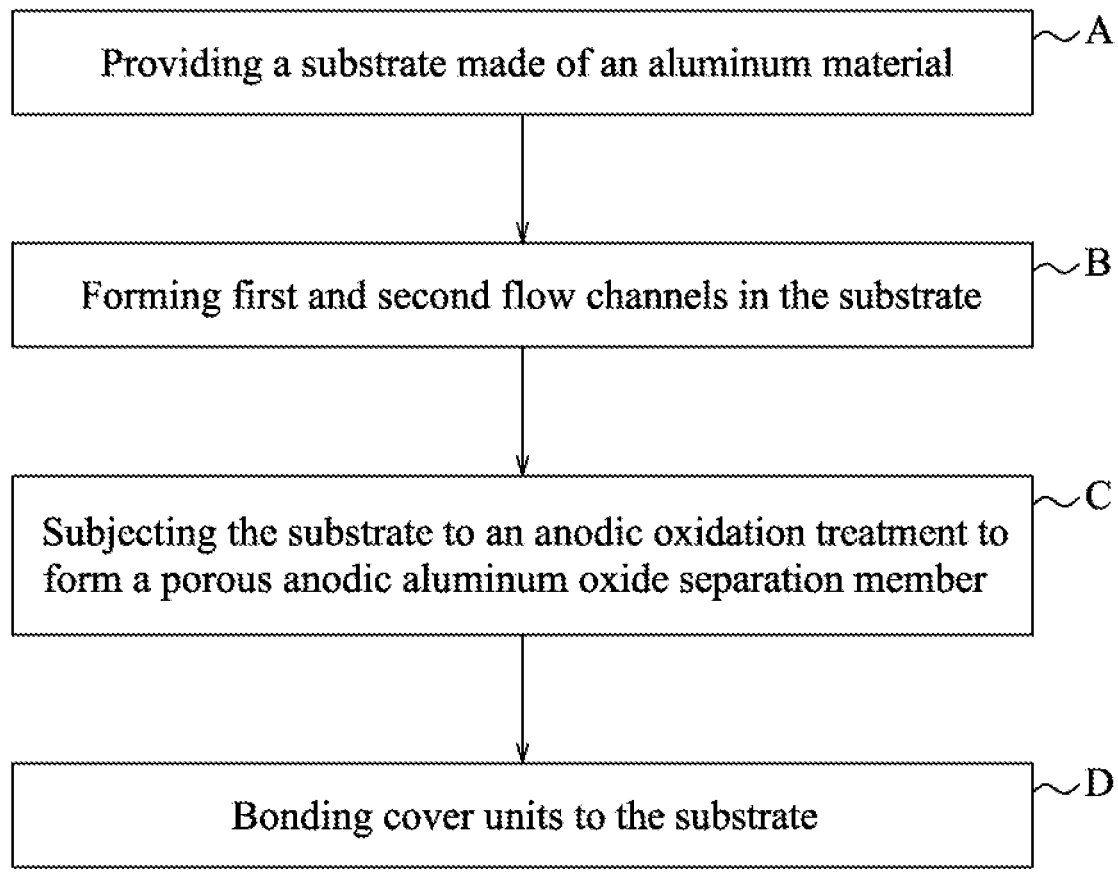
FIG. 3 is a flow chart illustrating consecutive steps of an embodiment of a method for manufacturing a planar separation column for gas chromatography according to the present disclosure.

Referring to FIG. 3, an embodiment of a manufacturing method of the planar separation component for gas chromatography according to the present disclosure includes the following steps.

In step (A), the aluminum-based substrate 2 without the channels 22, 23, 24 and the separation member 3 (not shown in the drawings) is provided.

In step (E), the spiral first flow channel 22, the spiral second flow channel 23, and the interconnecting channel 24 are formed in the substrate 2. The first flow channel 22 is defined by a first wall portion of the substrate 2. The second flow channel 23 is defined by a second wall portion of the substrate 2. In this step, the first flow channel 22, the second flow channel 23, and the interconnecting channel 24 are formed using a technique selected from the group consisting of chemical etching, laser ablation, and machining. Since the aforesaid techniques for forming channels in an aluminum-based substrate are well known to those skilled in the art, further details thereof are not provided herein for the sake of brevity.

In step (C), the substrate 2 is placed in an electrolytic cell, and then is subjected to an anodic oxidation treatment so as to form the porous anodic aluminum oxide separation member 3 (see FIG. 2). The channel-defining wall 31 is formed from the first and second wall portions of the substrate 2. To be specific, during the anodic oxidation treatment, the first wall portion of the substrate 2 (which is made of aluminum) forms the first wall section of the channel-defining wall 31 (which is composed of porous anodic aluminum oxide), and the second wall portion ox the substrate 2 (which is made of aluminum) forms the second wall section of the channel-defining wall 31 (which is composed of porous anodic aluminum oxide). After step (c), the planar body 21 of the substrate 2 and the separation member 3 integrally formed therewith are respectively composed of different materials, i.e., aluminum and porous anodic aluminum oxide.

To be specific, the anodic oxidation treatment is conducted under a voltage ranging from 10 V to 200 V, a temperature ranging from −10° C. to 60° C., and a time period ranging from 0.1 minute to 1000 minutes.

In step (D), each of the cover units 4 is bonded to the corresponding one of the first and second surfaces 211, 212 of the substrate 2 for respectively covering the first and second flow channels 22, 23.

In this embodiment, two aluminum foils (serving as the flexible covers 41) are bonded to the first and second surfaces 211, 212 of the substrate 2 by molten glass powder (serving as the bonding layers 40) through hot-press bonding. Thus, the planar separation component of the present disclosure as shown in FIGS. 1 and 2 is obtained.

Since the first and second flow channels 22, 23 are formed in the planar body 21 of the substrate 2 from the first and second surfaces 221, 212 thereof, the size of the first and second flow channels 22, 23 can be easily controlled, thereby simplifying the manufacturing process thereof. In addition, since the separation member 3 is directly formed on the planar body 21 of the substrate 2 right adjacent to the first and second flow channels 22, 23 through the anodic oxidation treatment, the problem of non-uniform coating or filling of a stationary phase material occurring in a conventional gas chromatography column can be avoided. Moreover, since the first and second flow channels 22, 23 respectively formed from the opposite first and second surfaces 211, 212 of the planar body 21 of the substrate 2 are in spatial communication with each other, the overall area of the separation member 3 can be increased without causing an increase in the size of the planar separation component, thereby improving the separation effect on mixtures to be subjected to gas chromatography.

In certain embodiments, alternatively, only one of the first and second flow channels 22, 23 may be formed from one of the first and second surfaces 211, 212 of the planar body 21 of the substrate 2 when the overall area of the separation member 3 of the planar separation component is not required to be large.

The present disclosure also provides a method for separating a mixture containing compounds different in boiling point, which includes subjecting the mixture to gas chromatography using the aforesaid planar separation component. The planar separation component may serve as a component of a gas chromatographer (not shown in the drawing) and may be disposed in such device.

Specifically, the first inlet 222 of the first flew channel 22 and the second outlet 232 of the second flow channel 23 may be respectively connected to an injection port of the gas chromatographer and a detector (not shown in the drawings) of the gas chromatographer for conducting gas chromatography.

When an analyte (i.e., a mixture of compounds) is subjected to gas chromatography using the planar separation component of the present disclosure, the analyte exiting from the injected port of the gas chromatographer enters into the first flow channel 22 through the first inlet 222 thereof, then flows along the first flow channel 22 to the first outlet 223 thereof so as to exit from the first flow channel 22 and to enter into the second flow channel 23 through the interconnecting channel 24 and the second inlet 231 of the second flow channel 23, and flows along the second flow channel 23 to the second outlet 232 thereof so as to exit from the second flow channel 23. During the flow of the analyte in the planar separation component, the compounds present in the analyte are separated and eluted. Subsequently, the eluted compounds sequentially enter into the detector for identification and analysis.

To test the separation effect of the planar separation component of the present disclosure, the following experiment was conducted.

Figure 5:
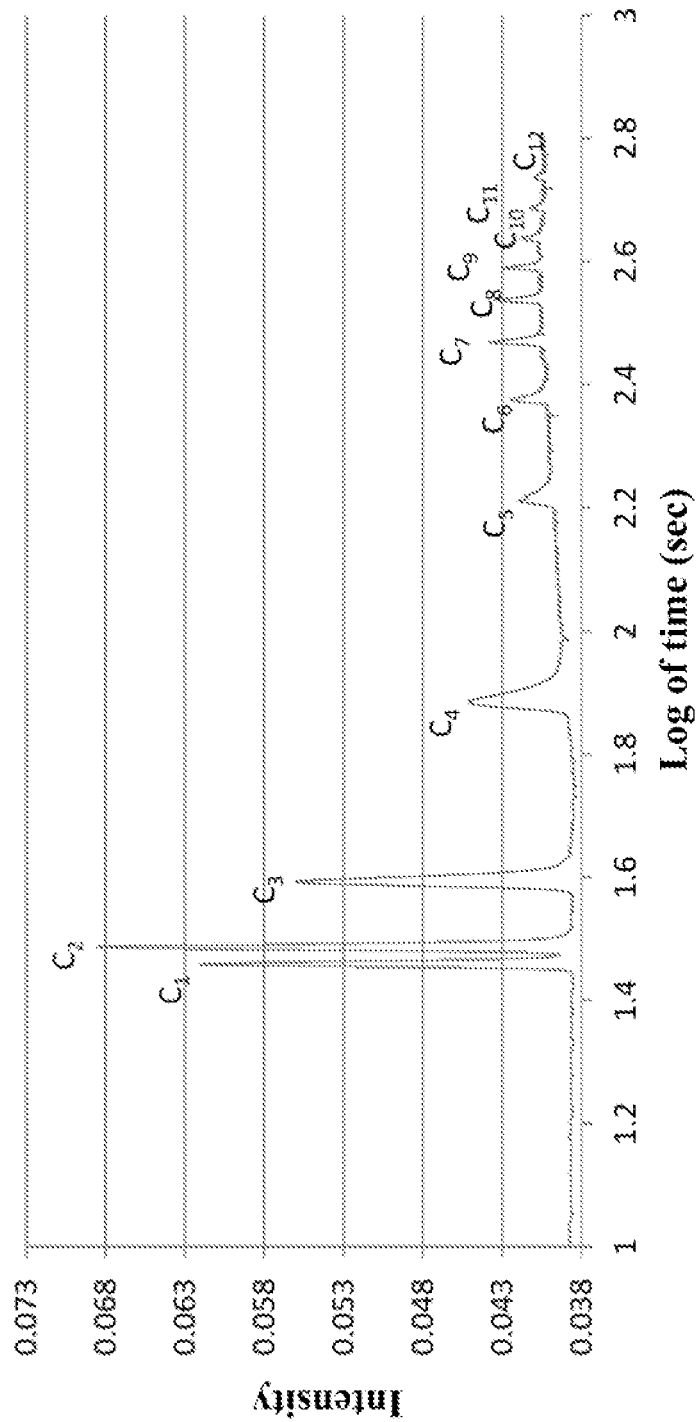
FIG. 5 is a chromatogram showing separation of the first mixture by gas chromatography performed using an exemplary planar separation component of the present disclosure.
Figure 6:
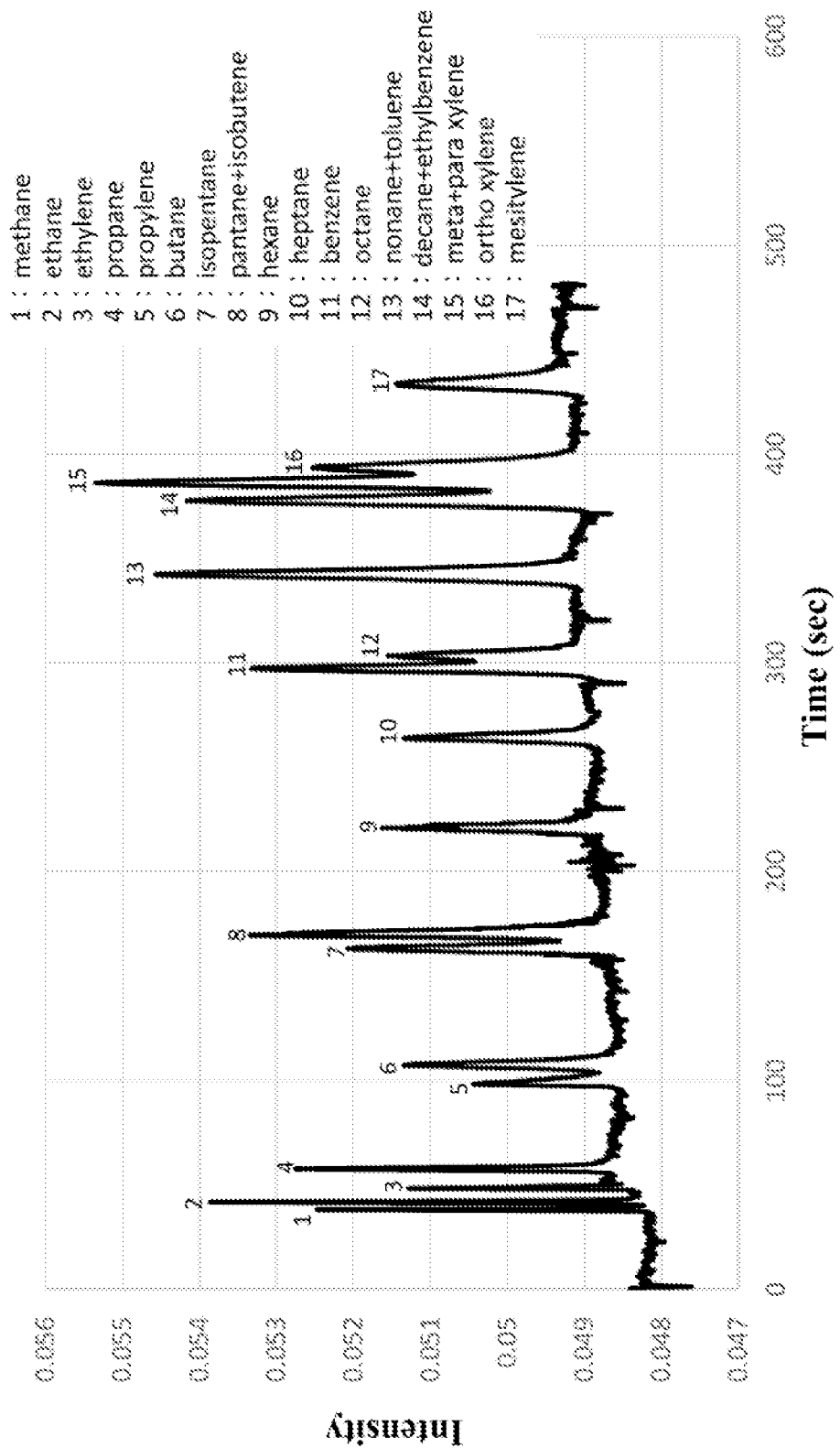
FIG. 6 is a chromatogram showing separation of a second mixture by gas chromatography performed using the exemplary planar separation component of the present disclosure.

Specifically, a first mixture containing $C_1$-$C_{12}$ straight-chain alkyl compounds (which have low and high boiling points) was subjected to gas chromatography using a respective one of an exemplary planar separation component for gas chromatography according to the present disclosure and a commercially available, conventional chromatography column (Manufacturer: Agilent; Model: DB-1). The exemplary planar separation component is generally the same as the aforesaid embodiment except for the specific length and channel width shown in Table 1 below, and contains the porous anodic aluminum oxide separation member 3 as the stationary phase. The conventional chromatography column contains a high-molecular weight polysilane polymer as the stationary phase. The conditions for performing gas chromatography are summarized in Table 1 below, and the results of gas chromatography are shown in FIGS. 4 to 6.

TABLE 1

| Gas chromatographer | Agilent HP 5890 Series II | |
|---|---|---|
| Type of separation component | Exemplary planar separation component | Conventional chromatography column (DB-1) |
| Size of chromatography column | Total channel length: 6 m; channel width: 0.5 mm | Length: 15 m; inner diameter: 0.53 mm |
| Temperature of injection port | Room temperature | |
| Mobile phase (i.e., carrier gas) | Nitrogen gas having a flow rate of 4 mL/min | |
| Heating procedure | Constant temperature of 40° C. for 40 seconds, followed by heating to 220° C. at a rate of 35° C./min | Constant temperature of 40° C. for 40 seconds, followed by heating to 220° C. at a rate of 35° C./min |
| Type and parameters of detector | Flame ionization detector (FID) having a temperature of 220° C., air flow of 400 mL/min, and hydrogen gas flow of 40 mL/min | |

Figure 4:
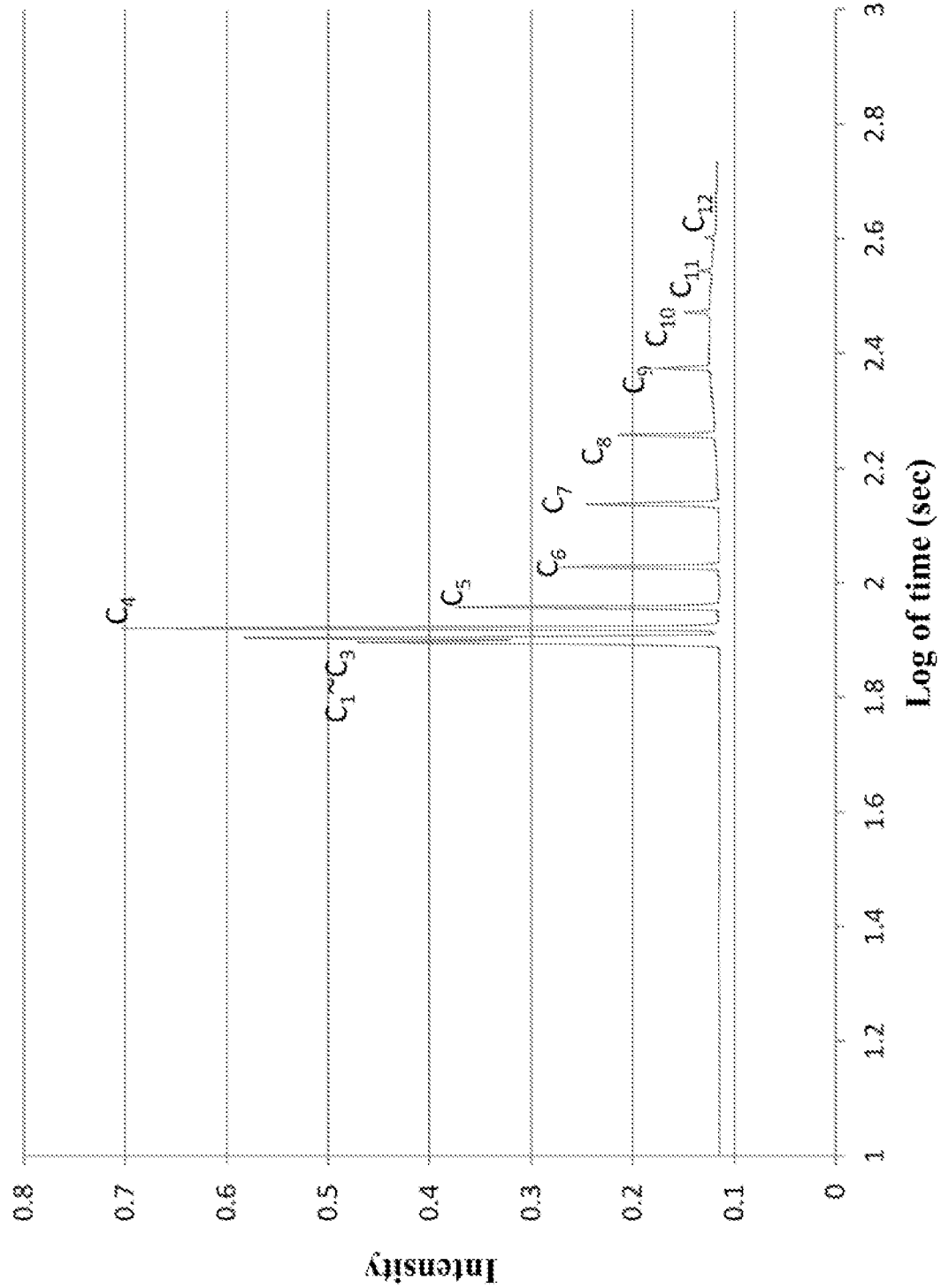
FIG. 4 is a chromatogram showing separation of a first mixture by gas chromatography performed using a conventional chromatography column.

FIG. 4 is a chromatogram showing separation of the $C_1$ to $C_{12}$ straight-chain alkyl compounds in the first mixture by gas chromatography performed using the conventional chromatography column, in which the peaks labeled with $C_1$ to $C_{12}$ correspond to straight-chain alkyl compounds having one carbon atom to twelve carbon atoms, respectively. As expected from the conventional chromatography column which contains a high-molecular weight polysilane polymer serving as the stationary phase and which is usually used for separating a mixture of compounds having high boiling points, such chromatography column, when used for separating the first mixture, showed a good separation effect on the $C_5$ to $C_{12}$ straight-chain alkyl compounds (i.e., straight-chain alkyl compounds having a number of carbon atoms of equal to or greater than 5), but exhibited a poor separation effect on the $C_1$ to $C_4$ straight-chain alkyl compounds (i.e., straight-chain alkyl compounds having a number of carbon atoms of less than 5).

In contrast, referring to FIG. 5 (denotations of $C_1$ to $C_{12}$ therein are the same as those of FIG. 4), when the first mixture containing the aforesaid $C_1$ to $C_{12}$ straight-chain alkyl compounds was subjected to gas chromatography using the exemplary planar separation component that contains porous anodic aluminum oxide as the stationary phase, such planar separation component, despite the channel length thereof being relatively shorter, had an excellent separation effect not only on the $C_1$ to $C_4$ straight-chain alkyl compounds that have low boiling points, but also on the $C_5$ to $C_{12}$ straight-chain alkyl compounds that have high boiling points. Furthermore, considering the separation effect on the $C_5$ to $C_{12}$ straight-chain alkyl compounds, the planar separation component of the present disclosure is comparable to the conventional chromatography column. Thus, porous anodic aluminum oxide can be applied to the planar separation component to effectively separate a mixture of compounds having high and low boiling points.

Referring to FIG. 6, the exemplary planar separation component, when used in a gas chromatography analysis for separating a second mixture containing $C_1$ to $C_{10}$ straight-chain alkyl compounds, $C_2$ to $C_4$ olefin compounds, and aromatic compounds with a benzene ring, under the same conditions as shown in Table 1, also showed a good separation effect on such compounds, indicating that the planar separation component of the present disclosure can effectively separate a mixture containing compounds which have high and low boiling points and which have different chemical structures.

In summary, the planar separation component of the present, disclosure, which includes the porous anodic aluminum oxide separation member 3 as the stationary phase, does not require an organic material to fix the stationary phase material (i.e., porous inorganic particles) because the porous anodic aluminum oxide separation member 3 can be formed from the planar body 21 of the substrate 2 during the anodic oxidation treatment. Thus, gas chromatography can be conducted under low and high temperatures using the planar separation component of the present disclosure, thereby solving the problem that the conventional chromatography column including porous inorganic particles as the stationary phase renders chromatography operable only under a low temperature.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice ox the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the present disclosure has been described in connection with what is considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:
1. A planar separation component for gas chromatography, comprising:
   a substrate made of an aluminum material and having a planar body and a spiral first flow channel, said planar body having a first surface and a second surface that is opposite to said first surface, said first flow channel being indented from said first surface toward said second surface, and having a first inlet configured to allow an analyte to enter said first flow channel, and a first outlet configured to allow the analyte to exit from said first flow channel;
   a porous anodic aluminum oxide separation member formed on said substrate and having a channel-defining wall and a plurality of nanosized pores, said channel-defining wall defining said first flow channel, and having a confronting surface that faces said first flow channel, and a contacting surface that is opposite to said confronting surface and in contact with said planar body, said nanosized pores being indented from said confronting surface toward said contacting surface and being in spatial communication with said first flow channel; and a cover unit bonded to said first surface of said planar body of said substrate for covering said first flow channel.

2. The planar separation component as claimed in claim 1, wherein said cover unit includes a flexible cover and a bonding layer that bonds said flexible cover to said substrate, said flexible cover and said bonding layer having a heat resistance to 300° C. and more.

3. The planar separation component as claimed in claim 2, wherein said flexible cover is an aluminum foil, and said bonding layer is made from an inorganic adhesive material.

4. The planar separation component as claimed in claim 1, wherein said substrate further has a spiral second flow channel and an interconnecting channel, said second flow channel being indented from said second surface of said planar body toward said first surface of said planar body, and having a second inlet that is configured to allow the analyte to enter said second flow channel, and a second outlet that is configured to allow the analyte to exit from said second flow channel, said interconnecting channel extending through said planar body to interconnect and be in spatial communication with said first outlet of said first flow channel and said second inlet of said second flow channel, said channel-defining wall having a first wall section that defines said first flow channel, and a second wall section that defines said second flow channel, said first and second wall sections having said confronting surface and said contacting surface, said confronting surface of said first wall section facing said first flow channel, said nanosized pores in said first wall section being in spatial communication with said first flow channel, said confronting surface of said second wall section facing said second flow channel, said nanosized pores in said second wall section being in spatial communication with said second flow channel, said planar separation component further including another cover unit bonded to said second surface of said planar body of said substrate for covering said second flow channel.

5. The planar separation component as claimed in claim 4, said first inlet of said first flow channel is positioned at an edge region of said planar body, said second outlet of said second flow channel being positioned at another edge region of said planar body, said first outlet of said first flow channel and said second inlet of said second flow channel being positioned at a central region of said planar body, said interconnecting channel extending through said central region of said planar body.

6. The planar separation component as claimed in claim 1, wherein each of said nanosized pores has a width that ranges from 10 nm to 500 nm, and a depth that ranges from 0.01 μm to 500 μm.

7. A method for separating a mixture containing compounds different in boiling point, comprising subjecting the mixture to gas chromatography using a planar separation component as claimed in claim 1.

8. A method for manufacturing a planar separation component for gas chromatography, comprising the steps of:

(A) providing a substrate that is made of an aluminum material and that has a planar body, the planar body having a first surface and a second surface that is opposite to the first surface;

(B) forming a spiral first flow channel in the substrate, the first flow channel being indented from the first surface toward the second surface, being defined by a first wall portion of the substrate, and having a first inlet that is configured to allow an analyte to enter the first flow channel, and a first outlet that is configured to allow the analyte to exit from the first flow channel;

(C) subjecting the substrate to an anodic oxidation treatment so as to form a porous anodic aluminum oxide separation member, the separation member having a channel-defining wall and a plurality of nanosized pores, the channel-defining wall being formed from the first wall portion of the substrate, and having a confronting surface that faces the first flow channel, and a contacting surface that is opposite to the confronting surface and in contact with the substrate, the nanosized pores being indented from the confronting surface toward the contacting surface and being in spatial communication with the first flow channel; and (D) bonding a cover unit to the first surface of the substrate so as to cover the first flow channel.

9. The method as claimed in claim 8, wherein in step (B), a spiral second flow channel and an interconnecting channel are further formed in the substrate, the second flow channel being indented from the second surface of the substrate toward the first surface, being defined by a second wall portion of the substrate, and having a second inlet that is configured to allow the analyte to enter the second flow channel, and a second outlet that is configured to allow the analyte to exit from the second flow channel, the interconnecting channel extending through the substrate to interconnect and be in spatial communication with the first outlet of the first flow channel and the second inlet of the second flow channel, wherein in step (C), the first wall portion of the substrate forms a first wall section of the channel-defining wall that defines the first flow channel, and the second wall portion of the substrate forms a second wall section of the channel-defining wall that defines the second flow channel, the first and second wall sections having the confronting surface and the contacting surface, the confronting surface of the first wall section facing the first flow channel, the nanosized pores in the first wall section being in spatial communication with the first flow channel, the confronting surface of the second wall section facing the second flow channel, the nanosized pores in the second wall section being in spatial communication with the second flow channel, and wherein in step (D), another cover unit is bonded to the second surface of the substrate for covering the second flow channel.

10. The method as claimed in claim 9, wherein in step (B), the second flow channel and the interconnecting channel are formed using a technique selected from the group consisting of etching, laser processing, and machining.

11. The method as claimed in claim 9, wherein in step (B), the first inlet of the first flow channel is formed at an edge region of the planar body, the second outlet of the second flow channel is formed at another edge region of the planar body, the first outlet of the first flow channel and the second inlet of the second flow channel are formed at a central region of the planar body, and the interconnecting channel is formed to extend through the central region of the planar body.

12. The method as claimed in claim 8, wherein in step (B), the first flow channel is formed using a technique selected from the group consisting of etching, laser processing, and machining.

* * * * *